Patented Aug. 22, 1939

2,170,629

UNITED STATES PATENT OFFICE 2,170,629

COLLOIDAL COMPOSITION

Jesse B. Bronstein, Jr., Allentown, Pa., assignor to Trojan Powder Company, Allentown, Pa.

No Drawing. Application July 2, 1938,
Serial No. 217,305

2 Claims. (Cl. 52—13)

My invention relates to improvements in colloidal compositions and more particularly relates to gels comprising nitrostarch and nitroisobutylglycerol trinitrate. The principal object of my invention is to provide colloidal compositions ranging in their physical nature from viscous liquids to tough solid gels, and suitable for use in smokeless powder, lacquers, gelatinous explosives and the like.

I have discovered that nitrostarch is readily soluble under certain conditions in nitroisobutylglycerol trinitrate and that this solution is favorably affected by the application of heat or by the action of a mutual solvent, and that by dissolving nitrostarch in nitroisobutylglycerol trinitrate preferably at temperatures over 50° C. but lower than 100° C., or by dissolving both nitrostarch and nitroisobutylglycerol trinitrate in a mutual solvent, such as acetone for example, I can obtain a series of transparent colloidal compositions ranging from viscous liquids through soft, readily deformable solids to tough gels. The nitrogen content of nitroisobutylglycerol trinitrate is (approximately) 19.44%, and my colloidal mixtures of nitrostarch and nitroisobutylglycerol trinitrate contains from 16.00% nitrogen to 17.50% nitrogen, depending upon the proportions of the two ingredients used. I have found that because of the high nitrogen content of these colloidal compositions, they have a wide field of usefulness in the manufacture of smokeless powder, and in the preparation of gelatinous explosives. They may be used as plasticizing ingredients, in increasing the plasticity of other normally less plastic explosives, and they may be used as coating or waterproofing agents for explosive cartridges or other explosive assemblies, where a waterproofing agent that is itself explosive or detonatable is desired. My compositions may also be used as components of lacquers or similar coating compositions, although in this field the high nitrogen content confers no added advantage.

In the preferred practice of my invention I use from 30 parts to 60 parts of nitrostarch, in combination with from 70 parts to 40 parts of nitroisobutylglycerol trinitrate, and I preferably colloid my ingredients by the use of a temperature between 40° C. and 80° C., for a period of from one hour to four hours or even more.

As an example of my invention I admix 30 pounds of nitrostarch containing approximately 13.00% nitrogen, with 70 pounds of nitroisobutylglycerol trinitrate, stirring the two materials together in the cold, until they are thoroughly incorporated. I then gradually heat the mixture, preferably in a steam-jacketed mixing vessel provided with stirring members, for a period of several hours at 80° C. Complete colloidization occurs, and the resulting product is a clear soft jelly, which forms a desirable series of plastic and gelatinous explosives by admixture with sodium nitrate, ammonium nitrate, and other well-known constituents of blasting explosives.

As another example of my invention I admix 40 pounds of nitrostarch containing approximately 12.75% nitrogen with 60 pounds of nitroisobutylglycerol trinitrate, and to this admixture I add slowly, under conditions of efficient stirring, 50 parts of acetone. I continue the incorporation of the ingredients, preferably in a vessel provided with a mechanical stirring means, for a period of about two hours at room temperature, the vessel being preferably tightly covered to prevent loss of acetone by volatilization. After incorporation the product is a clear, rather viscous liquid which may be incorporated as an ingredient of lacquers or other coating compositions.

As still another example of my invention I dissolve 50 pounds of nitrostarch in ethyl acetate, preferably using 50 pounds of ethyl acetate as the solvent, and to this solution to add slowly, with efficient stirring, 50 pounds of nitroisobutylglycerol trinitrate. After a period of incorporation of about two hours, the resulting product may be exposed to a circulating solvent recovery system for the recovery of the solvent, and the resulting tough, rubbery transparent product may be utilized in the manufacture of smokeless powder, lacquers, or for any purpose for which a tough colloid of high nitrogen content is suitable.

Because of the highly colloidal nature of my new products, they may be admixed with large quantities of diluting agents, while still maintaining their binding action as colloidal adhesives. In increasing the plasticity of explosives of pulverulent nature, I may employ as little as 3 parts by weight of my new colloidal mixtures of nitrostarch and nitroisobutylglycerol trinitrate to 97 parts of an explosive consisting predominantly of sodium, potassium or ammonium salts, while still obtaining a mixture of greatly increased coherence as compared with the original explosive mixture.

Although I may vary the relative amounts of nitrostarch and nitroisobutylglycerol trinitrate present in my products within very wide limits, for the purpose of modifying the softness, plasticity, flammability, detonatability and other physical characteristics of my products, I find in general that the amount of nitrostarch should not be less than one-third of the amount of nitroisobutylglycerol trinitrate that is present, and should not exceed three times the amount of nitroisobutylglycerol trinitrate that is present in the mixture. These relationships correspond to a minimum percentage of nitrostarch of 25% and a maximum percentage of nitrostarch of 75%, and a minimum percentage of nitroisobutylglycerol trinitrate of 25% and a maximum percentage of nitroisobutylglycerol trinitrate of 75%, in mixtures consisting exclusively of these two components.

When my new colloidal compositions are used as components of explosives, for the purpose of preparing gelatinous explosives, or for the purpose of improving or modifying the consistency and plasticity of explosive compositions, I employ my colloidal compositions as modifying or consistency-giving agents in admixture with the usual constituents of high explosives such as the nitrates, chlorates, or perchlorates of the alkali or alkali earth metals, in conjunction with the usual combustible agents, anti-acid ingredients, stabilizers and the like, commonly used in explosives formulation. In general, I may make explosive compositions consisting entirely of colloidal compositions of nitrostarch and nitroisobutylglycerol trinitrate, or I may "load" such colloidal compositions with any desired amounts of oxidizing salts, combustible ingredients and the like as may be desired to form explosives having desired properties. In the formulation of gelatinous explosives, I prefer to have my new colloidal compositions form the major portion of the explosive composition, with alkali and alkali earth nitrates, and particularly barium nitrate, sodium nitrate, potassium nitrate and ammonium nitrate, forming minor constituents of the mechanical admixture. When using my new products as consistency giving agents in high explosive compositions, however, I prefer to have the inorganic nitrates and other common constituents of explosives represent more than half of the explosive admixture, these organic nitrates in admixture with suitable combustible ingredients forming the major portion of the explosive composition, with my new colloidal consistency-modifying composition forming half or less of the total weight of the explosive composition.

It will be evident that many modifications may be made without departing from the scope of the disclosure herein described, and accordingly no limitations should be placed upon my invention except as are indicated in the appended claims.

I claim:

1. A colloidal composition comprising between 25% and 75% of nitrostarch and between 75% and 25% of nitroisobutylglycerol trinitrate.

2. A colloidal composition comprising nitrostarch and nitroisobutylglycerol trinitrate, in admixture with one or more compounds selected from the group consisting of calcium nitrate, strontium nitrate, barium nitrate, sodium nitrate, potassium nitrate, and ammonium nitrate, the nitroisobutylglycerol trinitrate being present in an amount at least equal to one-third of the amount of nitrostarch present in the mixture but not being present to the extent of more than three times the amount of nitrostarch present.

JESSE B. BRONSTEIN, Jr.